United States Patent
Demarco

(10) Patent No.: US 12,235,161 B2
(45) Date of Patent: Feb. 25, 2025

(54) SPARK STAND AND METHOD OF MAINTENANCE

(71) Applicant: Thermo Fisher Scientific (Ecublens), Ecublens (CH)

(72) Inventor: Fabio Demarco, Lausanne (CH)

(73) Assignee: Thermo Fisher Scientific (Ecublens) SARL, Ecublens (CH)

(*) Notice: Subject to any disclaimer, the term of this patent is extended or adjusted under 35 U.S.C. 154(b) by 280 days.

(21) Appl. No.: 17/641,923

(22) PCT Filed: Sep. 11, 2020

(86) PCT No.: PCT/EP2020/075513
§ 371 (c)(1),
(2) Date: Mar. 10, 2022

(87) PCT Pub. No.: WO2021/048382
PCT Pub. Date: Mar. 18, 2021

(65) Prior Publication Data
US 2022/0333990 A1     Oct. 20, 2022

(30) Foreign Application Priority Data
Sep. 12, 2019   (GB) .................................... 1913165

(51) Int. Cl.
*G01J 3/443*     (2006.01)
*G01J 3/02*      (2006.01)
(Continued)

(52) U.S. Cl.
CPC ............ *G01J 3/443* (2013.01); *G01J 3/0291* (2013.01); *G01N 21/67* (2013.01); *H05H 1/0037* (2013.01); *H05H 1/48* (2013.01)

(58) Field of Classification Search
CPC .......... G01N 21/67; G01J 3/0291; G01J 3/443
See application file for complete search history.

(56) References Cited

U.S. PATENT DOCUMENTS

| | | |
|---|---|---|
| 5,064,204 A | 11/1991 | Jarvinen et al. |
| 2001/0003272 A1 | 6/2001 | Schmitt et al. |

(Continued)

FOREIGN PATENT DOCUMENTS

| | | |
|---|---|---|
| CA | 632 697 A | 12/1961 |
| CN | 103080732 A | 5/2013 |

(Continued)

OTHER PUBLICATIONS

Thermo Scientific (Author RTh), "ARL easySpark Spare Part Lists (AA83784-00)," KOxeS76-00 (Stand), Jun. 2016, pp. 1-11, Retrieved from the Internet: URL: https://www.scientificinstrumentparts.com/attachments/easySpark.pdf.

(Continued)

*Primary Examiner* — Hina F Ayub

(57) ABSTRACT

A method of determining a peak intensity in an optical spectrum is described. The method includes producing a two-dimensional array of spectrum values by imaging the optical spectrum onto a detector array. An offset using an actual location and an expected location of a peak of an interpolated subarray is used to adjust an expected location of another peak that is within another two-dimensional subarray. Interpolated spectrum values are then used to produce a peak intensity value of the second peak.

13 Claims, 5 Drawing Sheets

(51) Int. Cl.
    *G01N 21/67*     (2006.01)
    *H05H 1/00*     (2006.01)
    *H05H 1/48*     (2006.01)

(56) References Cited

U.S. PATENT DOCUMENTS

| | | |
|---|---|---|
| 2002/0185604 A1 | 12/2002 | Coates et al. |
| 2004/0051866 A1 | 3/2004 | Eklin et al. |
| 2011/0001446 A1* | 1/2011 | Su ..................... H02K 11/24 |
| | | 318/475 |
| 2015/0020614 A1 | 1/2015 | Gettings et al. |
| 2018/0292259 A1* | 10/2018 | Leoni ................. G01N 21/13 |
| 2021/0285820 A1* | 9/2021 | Dominick ............ G01J 3/10 |

FOREIGN PATENT DOCUMENTS

| | | |
|---|---|---|
| CN | 203534959 U | 4/2014 |
| CN | 203 838 062 U | 9/2014 |
| DE | 10 2016 005191 A1 | 11/2016 |
| EP | 1 400 793 A2 | 3/2004 |
| JP | 2010197308 A | 9/2010 |
| WO | 2019211374 A1 | 11/2019 |

OTHER PUBLICATIONS

Combined Search and Examination Report dated Jan. 9, 2020, for GB Patent Application No. 1913165.5.
International Search Report and Written Opinion mailed on May 7, 2020, to PCT Application No. PCT/EP2020/075513.

* cited by examiner

SPARK STAND AND METHOD OF MAINTENANCE

CROSS-REFERENCE TO RELATED APPLICATIONS

This application is a National Stage application filed under 35 USC § 371 of International Patent Application No. PCT/EP2020/075513, filed on Sep. 11, 2020. PCT Application No, PCT/EP2020/075513, claims priority to GB 1913165.5, filed Sep. 12, 2019, both of which are incorporated by reference herein in their entirety.

FIELD OF THE INVENTION

This invention relates to the field of atomic emission spectroscopy, and more specifically an improved spark stand for an atomic emission spectrometer, or optical emission spectrometer. The spark stand facilitates maintenance and cleaning. There is also described an atomic emission spectrometer stage configured to receive the spark stand, a maintenance appliance for cleaning and maintenance of the spark stand, and a method of maintenance. An atomic emission spectrometer comprising the spark stand and the cooperating atomic emission spectrometer stage is also described.

BACKGROUND TO THE INVENTION

Spark or atomic emission spectrometry, also known as optical emission spectroscopy, is a well-known technique for analysis of solid samples. A solid sample is subjected to a spark or electrical discharge which vaporises a portion of the sample to form a plasma, in which excited atoms of the sample emit light of wavelengths that are characteristic of the elements present in the sample. Subsequent spectroscopic analysis of the discharged light provides information on the material composition of the sample.

Spark or arc atomic emission spectrometers (AES) commonly comprise a spark stand (or spark table) having a sample position at an analysis table, at which a conductive sample can be mounted. The analysis table contains an aperture or opening to a gas or spark chamber below. The sample, which is larger than the aperture, can be mounted over the aperture to form a gas-tight seal between the sample and the analysis table. An electrode of the AES is arranged protruding into the spark chamber below the sample, proximate to but spaced apart from, the aperture in the receiver plate. Applying a voltage between the electrode and the analysis table (and so the sample) ignites a spark or arc between the electrode and table or sample. This causes a portion of the sample that is exposed to the spark through the aperture of the plate to be vaporised or ablated and form a plasma.

To avoid adulteration of the optical spectra, the sample is vaporised and excited in the presence of an inert gas such as argon. Typically, a flow of the inert gas is passed through the spark chamber which houses the electrode and in which the plasma is formed. The inert gas flows into the spark chamber through a passageway or conduit forming a gas inlet, and the gas (and any ablated material) is carried from the spark chamber via a passageway or conduit forming a gas outlet.

In use, debris, dust and residue ablated material can build up in the spark chamber and the gas inlet and gas outlet. As a consequence, when different samples (having different material matrices) are analysed on the same spark stand, the build-up can contaminate the plasma and affect the analytical results. As a consequence, the gas inlet, spark chamber and gas outlet at the spark stand must be cleaned periodically, especially between analyses of different types of sample. This cleaning process is both labour intensive and results in downtime for the instrument.

As such, there is a requirement for a spark stand for an atomic emission spectrometer which solves these problems.

SUMMARY OF THE INVENTION

The present invention looks to solve these problems by providing the spark stand as a separate sub-assembly. In particular, the spark stand is provided as a flexible, easy-to-substitute unit or cartridge (comprising all the parts of the spectrometer that may be prone to build up of debris and ablated material), which can be easily coupled and decoupled from the spectrometer in order to allow cleaning and maintenance. The spark stand cartridge or unit can be removed from the rest of the spectrometer without tools, by use of a simple mechanical or magnetic fastening or locking system between the spark stand and a stage at the spectrometer. Not only does removal of the spark stand from the spectrometer improve the ease of cleaning, it also allows for methods of cleaning to be used in conjunction with the separate spark stand which would otherwise not be possible (for instance, in prior art systems). Moreover, the spark stand units may be interchangeable, to allow for parallel cleaning of a spark stand unit whilst analysis is performed at the spectrometer using another, different spark stand. In a laboratory, this reduces downtime of a valuable scientific tool.

Some of the benefits of the described system include: a) providing easier and more efficient cleaning of the spark stand of an atomic emission spectrometer; b) significantly reducing overall maintenance time for the atomic emission spectrometer; c) drastically decreasing instrument downtime (and turn-around time between measurements); and d) improving the reliability of analytical results obtained via the atomic emission spectrometer, by reduction in contamination.

In a first aspect, there is described a spark stand for an atomic emission spectrometer, comprising:
  a spark chamber;
  a gas inlet for flowing gas into the spark chamber; and
  a gas outlet for carrying gas from the spark chamber;
  wherein the spark stand is adapted to be decouplable from the atomic emission spectrometer, to permit removal and exchange with another spark stand.

In particular, the spark stand or spark table comprises each of a spark chamber, a gas inlet and a gas outlet, which are defined within a removable unit or cartridge. The removable unit or cartridge is configured to connect to an atomic emission spectrometer (or more specifically, a stage at the atomic emission spectrometer) to operate as a spark stand. The removable unit or cartridge can be easily disconnected or decoupled from the atomic emission spectrometer stage, to allow for maintenance and cleaning separately from the atomic emission spectrometer. Advantageously, different spark stands can be exchanged so that analysis can continue in parallel with cleaning of a used spark stand, thereby reducing the downtime of the apparatus. The atomic emission spectrometer stage may be an integral part of an atomic emission spectrometer body, or may be fixed (permanently or semi-permanently) to the body of the spectrometer.

The spark stand may be configured for tool-less coupling and decoupling from the atomic emission spectrometer stage. In particular, the coupling and decoupling means may be actuated by an operator directly at the machine, without requiring separate tools. In particular, the tool-less mechanism of coupling and decoupling avoids semi-permanent fixtures, such as screws fastening a portion of the spark stand to the rest of the atomic emission spectrometer. Removal of the described spark stand from the atomic emission spectrometer stage does not require screwdrivers or wrenches, for instance.

Preferably the spark stand comprises a releasable locking mechanism, configured for releasably coupling the spark stand to the atomic emission spectrometer stage. Optionally, the releasable locking mechanism is configured to couple the spark stand to the spectrometer when arranged in a first position, and to decouple the spark stand from the spectrometer when arranged in a second position. Preferably, the locking mechanism can be moved between the first position and the second position without use of tools. The locking mechanism may include a lever which, when actuated by the operator of the spectrometer (or a robotic arm in an automated system), moves a portion of the locking mechanism at the spectrometer or the spark stand so as to cooperate or interlock with a portion of the locking mechanism at the spark stand or at the spectrometer, respectively. The locking mechanism may incorporate a spring and cam, and may include buttons or levers (at the spectrometer stage or spark stand) to actuate the moving portions of the locking mechanism.

The spark stand may further comprise an electrode arranged to protrude into the spark chamber, the electrode configured to make electrical contact with a power source at the atomic emission spectrometer when the spark stand cartridge (or, in other words, the spark stand) is coupled to the atomic emission spectrometer stage. The electrode may be adapted to be decouplable from the power source at the atomic emission spectrometer when the spark stage is removed from the atomic emission spectrometer stage. The electrode may be fixed at the spark stand and have an insulator arranged circumferentially around the electrode, to prevent electrical contact between the electrode and the body or walls of the spark stand (and in particular, the walls of the spark chamber). The electrode may be fixed within the wall of the spark stand using O-rings to form a seal, in particular a gas-tight seal.

Preferably, the electrode is elongate, and the electrode is arranged to protrude into the spark chamber at a first end, and the electrode is adapted to couple with the power source at a second end, distal from the first end, to make electrical contact between the electrode and the power source when the spark stand cartridge (or spark stand) is coupled to the atomic emission spectrometer stage. The electrode may be substantially cylindrical, but with pointed (or pyramidal) first and/or second end. However, various shapes of electrode are possible. In particular, the second end may be shaped in any configuration which ensures reliable electrical contact to the power source.

Optionally, a resilient contact provides electrical contact between the electrode and the atomic emission spectrometer, the resilient contact configured to be under compression when the spark stand cartridge (or spark stand) is coupled to the atomic emission spectrometer stage. In other words, a contact or connector between the electrode and the power source may comprise a metallic spring, or other resilient connector. When the spark stand is coupled to the atomic emission spectrometer stage, the spring may be compressed between the electrode and a contact component at the power source, thereby providing constant and consistent electrical contact.

Preferably, the spark stand comprises an upper and a lower table, wherein the gas inlet, the gas outlet and the spark chamber are defined between the upper and lower table. In other words, the upper and lower table are joined to form the spark stand. The gas inlet or passageway, the spark chamber, and the gas outlet or passageway are formed as cavities defined between the upper and lower tables.

Optionally, the spark stand comprises a retractable connector at the gas inlet, and/or a retractable connector at the gas outlet, each configured to mate with corresponding connectors at the atomic emission spectrometer when the spark stand cartridge (or spark stand) is coupled to the atomic emission spectrometer. The retractable connector may be sprung, push-fit or otherwise moveable to mate with a connector at the atomic emission spectrometer. The connector may retract (mechanically or magnetically), for example linearly retract, in order to allow the spark stand to be positioned and be locked onto the stage at the atomic emission spectrometer. A resilient seal (or O-ring) may be arranged at the retractable connectors, in order to reduce gas leaks from the connection. In an alternative, the spark stand has fixed connectors at the gas inlet and gas outlet, for mating with retractable connectors at the respective outlet and/or inlet at the atomic emission spectrometer stage, which may have resilient seals (or O-rings).

Preferably, the spark stand comprises one or more projections or cavities, for cooperation with a respective one or more cavities or projections at the atomic emission spectrometer. For instance, the projections may be locking pins or fixture pins, protruding from the base of a spark stand at a surface that is opposing the atomic emission spectrometer stage, when connected. Any suitable number of projections and respective cavities may be provided, for example, 1, 2, 3, 4, 5, 6 or more. The projections (or locking pins or fixture pins) may be received at respective cavities or bores arranged on the stage of the atomic emission spectrometer. The projections or cavities allow proper alignment and seating of the spark stand on the atomic emission spectrometer.

Optionally, at least one of the one or more projections are arranged at the spark stand, and the at least one of the one or more projections are adapted for cooperation with the releasable locking mechanism at the atomic emission spectrometer. In other words the projections (or locking pins or fixture pins) may also form part of the locking mechanism, and cooperate with a portion of the locking mechanism at the spectrometer stage, in order to securely couple the spark stand to the spectrometer.

In a second aspect there is an atomic emission spectrometer adapted to be releasably couplable to the spark stand described above. More specifically, there is an atomic emission spectrometer stage adapted to be releasably couplable to the spark stand above, wherein the atomic emission spectrometer stage supports the spark stand when in use. In use, the spark stand may be placed on and coupled to the atomic emission spectrometer stage. The atomic emission spectrometer stage may be any portion of the overall atomic emission spectrometer to which the spark stand is coupled or connected.

Preferably, the atomic emission spectrometer stage may be configured for tool-less coupling and decoupling from the spark stand. In other words, the spectrometer stage may be configured such that the spark stand can be attached and detached without the requirement of tools such as a wrench, screwdriver or any specialist or custom tool. This allows for quick and easy removal of the spark stand from the atomic emission spectrometer.

Preferably, the atomic emission spectrometer stage comprises a releasable locking mechanism, configured to releasably couple the spectrometer stage to the spark stand. The releasable locking mechanism at the spectrometer stage may cooperate with portions of the locking mechanism at the spark stand. The releasable locking mechanism may include a mechanical or a magnetic coupling between the spark stand and the spectrometer stage. The releasable locking system may be controlled by a controller or motorised, robotic mechanism, to automate the procedure of coupling and decoupling of the spark stand from the atomic emission spectrometer stage.

Preferably, the releasable locking mechanism is configured to cooperate with at least one projection (otherwise described as a locking pin or fixture pin) at the spark stand. In some cases, moveable portions of a mechanical releasable locking system (including a handle or lever for operation of the locking system) may be at the spectrometer stage, with fixed portions of the locking system (such one or more locking pins) at the spark stand. This may be beneficial to reduce the bulk, weight and complexity of the spark stand. Whilst it is less preferable for this reason, it is nevertheless possible for the spark stand to comprise moveable portions of such a releasable locking mechanism with fixed portions of the locking system (such a locking pins) at the spectrometer stage.

Optionally, the releasable locking mechanism is configured to couple the atomic emission spectrometer stage to the spark stand when arranged in a first position, and to decouple the atomic emission spectrometer stage from the spark stand when arranged in a second position. In other words, the releasable locking mechanism is a mechanical locking mechanism in which a movable portion of the locking system at the atomic emission spectrometer stage in a first position interlocks with a portion of the spark stand, and wherein the movable portion of the locking system at the atomic emission spectrometer stage in a second position does not interlock with the portion of the spark stand. In an alternative, the releasable locking mechanism may be a magnetic coupling system, for instance using a solenoid at the spectrometer stage. In one example, activating the magnetic coupling system applies a magnetic force to hold the locking or fixture pins of the spark stand to the spectrometer stage, and deactivating the magnetic coupling system removes the magnetic force to release the locking or fixture pins.

Preferably, the atomic emission spectrometer stage further comprises a connecting contact, configured to make electrical contact between the electrode of the spark stand and a power source of the atomic emission spectrometer when the spark stand is coupled to the spectrometer stage. The connecting contact electrically connects the electrode to the power source.

Preferably, the connecting contact is a resilient contact, configured so that the resilient contact is under compression when the electrode of the spark stand is coupled to the atomic emission spectrometer stage. For instance, the connecting contact may be a sprung contact, such as a metallic spring. The spring may be configured such that the electrode of the spark stand cartridge (or spark stand) applies a compressive force to the spring when the spark stand is coupled to the spectrometer stage. In particular, the electrode may be fixed in the spark stand, and when the spark stand is coupled to the atomic emission spectrometer stage the electrode may apply a force to compress a spring contact arranged at the atomic emission spectrometer stage.

Preferably, the atomic emission spectrometer stage comprises a gas outlet for connection to the gas inlet at the spark stand, and a gas inlet for connection to the gas outlet at the spark stand. The gas outlet and gas inlet at the atomic emission spectrometer stage may be configured to align with the gas inlet and gas outlet at the spark stand when the two parts are coupled.

Preferably, the atomic emission spectrometer stage comprises a retractable connector at the gas outlet of the atomic emission spectrometer stage, and/or a retractable connector at the gas inlet of the atomic emission spectrometer stage, the retractable connector(s) configured to mate with a corresponding connector at the respective gas inlet and gas outlet at the spark stand when the spark stand is coupled to the atomic emission spectrometer stage. It can be preferable to include a retractable connector at the atomic emission spectroscopy stage, to mate with a fixed connector at the spark stand, as this reduces the complexity of the spark stand.

The described spark stand and cooperating atomic emission spectrometer stage can be included in an atomic emission spectrometer, resulting in a system with a number of benefits. In particular, the system can improve the overall analytical results of the spectrometer in a number of ways, as described below.

i) Eliminating or reducing contamination arising by using multiple material matrices on the same spark stand. Instead, the invention allows for the exchange of the whole spark stand unit in one step, and so use of dedicated sparks stands for particular sample material types.

ii) Improving sealing at the spark chamber, therefore stabilising the inert gas flow and enhancing the plasma stability during analysis. In part, this may result from the improved cleaning of the spark stand, and removal of debris which can cause a turbulent gas flow. Furthermore, this may result from the more effective leak testing that can be performed, as part of the maintenance method described below.

iii) Increasing the accuracy of the gap size between the sample and the electrode during and before analysis, thus improving the repeatability of the plasma conditions.

iv) Performing systematic cleaning and testing of the spark stand unit by using the maintenance appliance described below (including testing the sealing, impedance, metallisation and gas flow through the spark stand).

v) Reducing the risk of operator error when cleaning or maintaining the spectrometer, due to use of the maintenance appliance described below.

In a third aspect, there is described a maintenance appliance adapted to be releasably couplable to the spark stand described above. The maintenance appliance comprises:

a first orifice for connection to a gas inlet at a spark stand coupled to the maintenance appliance;

a second orifice for connection to a gas outlet at a spark stand coupled to the maintenance appliance;

the maintenance appliance configured to flow a fluid (liquid or a gas) between the first orifice and the second orifice when a spark stand is coupled to the maintenance appliance, the liquid or the gas flowing between the first orifice and the second orifice by passing through the gas inlet, the spark chamber and the gas outlet of the coupled spark stand. It will be understood that the fluid may be flowed in a first direction (to be passed through the first orifice to subsequently be received through the second orifice), or in an opposite, second direction (to be passed through the second orifice to subsequently be received through the first orifice). In either case, the fluid flows between the first and second orifice, via the spark stand. The first and second orifice may be a first and second opening to a respective first and second conduit or passageway through a portion of the maintenance appliance, through which the fluid can be directed.

The maintenance appliance is used for cleaning and upkeep of a spark stand of the type described above. The maintenance appliance provides a support or holder for the spark stand when not coupled to the atomic emission spectrometer stage. Moreover, the maintenance appliance is configured to flow liquid or gas through the internal chambers of a spark stand coupled to the maintenance appliance. In this way, debris or ablated material that is accumulated on the internal surfaces of the spark stand can be removed. Beneficially, the maintenance appliance allows for effective cleaning of the spark stand in a less labour intensive manner that in the prior art designs. The spark stand can be easily removed from the spectrometer, and cleaning can be performed without dismantling the components of the spark stand.

Preferably, the maintenance appliance is configured to inject a pressurised liquid or gas. In other words, the liquid or gas is passed though the maintenance appliance (and coupled spark stand) at a high flow rate. For instance the flow rate may be between 10 and 40 litres/minute, and more preferably above 20 litres/minute. In one example, a flow rate of 30 litres/minute may be used. This creates sufficient frictional force against the walls of the internal cavities of the spark stand to remove debris, dust and ablated material. In some cases, a liquid or gas can be selected so as to undergo a chemical reaction with ablated material, thus chemically cleaning the internal cavities of the spark stand. Examples of suitable fluids include high-pressure argon or helium gas, or liquid isopropyl alcohol or liquid hexane (non-polar solvents). Other suitable example fluids include air or nitrogen gas, or liquid ethanol or acetone.

Preferably, the maintenance appliance is configured to inject a continuous or a pulsed flow of liquid or gas. In other words, the gas or liquid (fluid) flow can continue throughout the duration of the cleaning period, or jets of gas or liquid can be pushed or pumped through the system. The type of fluid flow may depend of the type of debris and ablated material, and the nature of the build-up to be removed.

Preferably, the maintenance appliance comprises a seal, to close an aperture or opening to the spark chamber at a sample position of the spark stand when the spark stand is coupled to the maintenance appliance. This may be a plug for the aperture to the spark chamber formed in the upper surface of the spark stand, or may be a sealing material which is clamped over or otherwise attached over the aperture to the spark chamber. The seal provides a closed, sealed system, such that the fluid (liquid or gas) passed through the spark stand via the maintenance appliance is forced through the gas inlet, the spark chamber and the gas outlet of the spark stand. This, the seal provides more efficient and effective cleaning.

Optionally, the maintenance appliance comprises a cavity to receive a portion of the electrode protruding from a spark stand coupled to the maintenance appliance. Optimally, the maintenance appliance comprises one or more projections or cavities, for cooperation with the respective one or more cavities or projections at the spark stand. In other words, the maintenance appliance is configured with cavities to receive any portion projecting from the base of the spark stand or with projecting portions to engage in any cavities in the base of the spark stand. This allows the spark stand to be better supported by the maintenance appliance.

Optionally, an adjustor mechanism may be provided at the maintenance appliance, for adjusting the position of the electrode at the spark stand, and more particularly for adjusting the amount (or height) which the electrode protrudes into the spark chamber. Beneficially, this may provide a more precise positioning of the electrode, in particular to configure the spark stand having a predetermined gap between the uppermost portion or tip of the electrode within the spark chamber and the aperture to the spark chamber. The gap or distance between the tip of the electrode and the aperture (and therefore, to any sample positioned at the sample position of the spark stand during a measurement) will affect the operation of the atomic emission spectrometer and the arc or spark formed to ablate the sample. Therefore, optimisation of the gap by use of the adjustor mechanism to move the electrode may significantly improve the operation of the spectrometer and repeatability of different measurements. In a particular example, the desired gap is around 3 mm. The accuracy of positioning of the electrode in prior art systems is around +/−0.03 mm. However, by use of the described adjustor mechanism it is possible to increase the accuracy of positioning of the electrode the gap to around +/−0.01 mm. The described maintenance appliance also allows for more accurate measurement of this gap.

In a fourth aspect there is described a method of maintenance of a spark stand comprising a spark chamber, a gas inlet for flowing gas into the spark chamber, and a gas outlet for carrying gas from the spark chamber, wherein the spark stand is adapted to be decouplable from an atomic emission spectrometer, the method comprising:

coupling the spark stand to a maintenance appliance, the maintenance appliance configured to have a first orifice and a second orifice, the first orifice and the second orifice configured to connect to the gas inlet and the gas outlet, respectively, at the spark stand;

flowing a liquid or a gas between the first orifice and the second orifice through (or via) the gas inlet, the spark chamber, and the gas outlet at the spark stand.

A number of features of the maintenance appliance have been described above.

The method of maintenance is applied to a spark stand that has been decoupled and removed from an atomic emission spectrometer stage, of the type described above. Therefore, before performing the method of maintenance, the spark stand must be detached and removed from the spectrometer. Beneficially, the described method of maintenance is less labour intensive and less awkward than manually dismantling and cleaning of the spark stand in situ within the spectrometer, as required in prior art systems. The method of maintenance, which makes use of the described maintenance appliance, is made possible by the removable and interchangeable nature of the spark stand discussed above.

Preferably, the method of maintenance comprises, prior to flowing the liquid or gas, sealing an aperture or opening to the spark chamber, the aperture arranged at the sample position of the spark stand. This creates a closed system, so that any fluid (liquid or gas) passing through the spark stand must exit through the gas outlet at the spark stand. This increases the pressure of the fluid passing through the spark stand, and so improves cleaning.

Preferably, the method comprises, after sealing the aperture to the spark chamber, pressurising the gas inlet, the spark chamber and the gas outlet at the spark stand to a known pressure; after elapse of a predetermined time period, measuring the pressure; and comparing the measured pressure to the known pressure. If a difference in magnitude between the measured pressure and the known pressure is greater than a predefined amount, then repeating the sealing step. In other words, a test is performed to ensure that there is a leak proof seal of the aperture to the spark chamber, or to other seals within the system (such as between the first and second orifice of the maintenance appliance and the gas inlet and outlet at the spark table, or at the position where the electrode protrudes into the spark chamber, for instance). The test checks that a specific pressure is maintained over a period of time. If so, it can be assumed that there no leaks are present into (or out of) the spark chamber. If leaks are identified then the seal at the aperture of the spark chamber should be remade. In a particular example, the gas inlet, the spark chamber and the gas outlet at the spark stand are pressurised to around 150 mBar. If the pressure loss is less than 10 mBar over a period of 10 minutes, then no (significant) leaks are considered to be present. However, if the pressure loss is larger than 10 mBar within that period, then the seals of the system are checked and/or remade.

Preferably, after the flowing step, the method further comprises: applying an electrical current between an electrical connection to the gas inlet of the spark stand and an electrical connection at the gas outlet of the spark stand; measuring the resistivity between the electrical connection to the gas inlet of the spark stand and the electrical connection at the gas outlet of the spark stand; and comparing the resistivity to a predetermined range. If the resistivity is within the predetermined range, then at least the flowing step is repeated. In particular, the resistivity is inversely proportional to the amount of dust or debris accumulated in the spark stand. Therefore, if the resistivity is too low, the cleaning process should be repeated. As will be understood, the impedance maybe measured in place of the resistivity, if an alternating current is used. In a specific example, an alternating voltage is applied and the impedance measured. The alternating voltage may be applied with different frequencies depending on the analytical conditions used (for instance, an alternating voltage of 200 to 800 Hz may be used).

Preferably, flowing the liquid or the gas comprises injecting a pressurised liquid or gas. In other words, the fluid is passed at a high flow rate, to generate frictional forces against the debris and ablated material at the walls of the inner chambers of the spark stand. The flow rate may be more than 20 litres/minute. In a particular example, the flow rate is around 30 litres/minute.

Preferably, injecting the pressurised liquid or gas comprises injecting a continuous or pulsed flow of the liquid or the gas. The fluid can be pumped through the system in jets, for instance. This may provide a more effective cleaning.

The fluid (liquid or gas) may be any fluid suitable for creating sufficient frictional forces to clean the internal chambers of the spark stand. The fluid may be a reagent for chemical reaction with the ablated material, in order to remove the ablated material from the internal walls of the spark stand. Example fluids include high pressure argon or helium gases, which are beneficially inert and non-polar. In another example, liquid isopropyl alcohol or liquid hexane could be used, which are non-polar and have a low boiling point, so leaving no trace or residue after a short period of time.

Optionally, after the flowing step, a visual check of the internal chambers of the spark stand (including the gas inlet, the spark chamber and the gas outlet) may be made. The visual check may be via a camera inserted through the internal passageways and chambers of the spark stand. The camera may be connected to the maintenance appliance. In particular, the visual check may be useful to check for metallisation (or accumulation of ablated sample material or other debris) at the electrode and/or the insulator circumferentially arranged around the electrode within the spark chamber.

Optionally, after the flowing step or after the comparison of the resistivity described above, a further test of the flow rate through the spark stand can be made. This measures the flow rate of a fluid passed through the chambers of the spark chamber, and may also test the pressure at the gas inlet and the gas outlet of the spark stand. A slower flow rate (and/or a difference in the pressure between the inlet and outlet) may indicate that some ablated material or debris may remain at the inner walls of the spark stand (causing turbulent flow). Therefore, if the flow rate is less that an expected rate the cleaning process described above may be repeated.

Preferably, the method of maintenance may comprise adjusting the position of an electrode protruding into the spark chamber of the spark stand. This step may take place after the flowing step, and more preferably as the final step of the method of maintenance. The adjusting may comprise adjusting the extent of the protrusion of the electrode into the spark chamber. In particular, adjusting the extent of protrusion into the spark chamber may change the distance or gap between the tip of the electrode within the spark chamber, and the aperture to the spark chamber (and consequently a sample positioned on the spark stand over the aperture). This distance or gap will affect the arc or spark formed when the spectrometer is in use, and so the ablation of sample material. Therefore, the step of adjusting the position of an electrode protruding into the spark chamber of the spark stand may be used to optimise this distance. Advantageously, the described method of maintenance allows for more accurate adjustment of the electrode to the optimum gap thereby increasing consistency of the gap size between measurements, and a better repeatability of the spectroscopic analysis.

The spark stand may comprise an upper and a lower table, wherein the gas inlet, the gas outlet and the spark chamber are defined between the upper and lower table. In some examples, the method of maintenance may comprise separating the upper and lower table, to provide easier access to the walls of the gas inlet, gas outlet or spark chamber for maintenance and cleaning.

In summary, the method of maintenance may comprise at least some of the following steps: 1) cleaning of the internal passageways and cavities of the spark stand by flow of a gas or liquid stream; 2) performance of a leak test to check the seals between components of the spark stand; 3) performance of an impedance or resistivity test to identify the extent of accumulated sample material or debris at the walls of the internal passageways and cavities of the spark stand (before and/or after cleaning according to step 1); 4) performance of a visual check to for metallisation at the internal passageways and cavities of the spark stand (before and/or after cleaning according to step 1); 5) performance a flow test to check the throughput through the internal passageways and cavities of the spark stand (before and/or after cleaning according to step 1); 6) opening of the spark stand (by separation of the upper and lower table) to provide access for cleaning of internal passageways and cavities of the spark stand; and/or 7) adjusting the gap between the aperture to the spark chamber and the tip of the electrode protruding into the spark chamber.

In a fifth aspect, there is described a controller configured to control the flowing or the injecting of a liquid or a gas according to the method of maintenance described above. Preferably, the controller is configured to control the pressurising, measuring and comparing steps described above. Preferably, the controller is configured to control the applying, measuring and comparing steps described above. In other words, the controller may control all aspects of the method of maintenance, so that the cleaning of the spark chamber is an automated or semi-automated process.

In an example, the same or a separate controller may be used to control the actuation of the locking system between the spark stand and the atomic emission spectrometer stage. The controller/s may form part of a computer, which has a processor for execution of instructions for control of the processes described herein. In a particular example, a fully automated atomic emission spectroscopy system could be used, in which the detachable spark stand is manipulated by a robot. For instance, the system may manipulate the spark stand using a mechanical, robotic arm, including operating the locking mechanism. The system may also automatically manipulate or release a connector at the gas inlet and gas outlet to the spark stand. For instance this can be via movement of one or more retractable connector at the spectrometer stage using actuators (mechanically, or using a solenoid). An automated mechanism may also be used to adjust the position of the electrode and its height of protrusion into the spark chamber. Such an automated system would provide a number of benefits including: a) significantly reducing maintenance time; b) drastically reducing instrument downtime; and c) allowing for automatically changing the spark stand according to the material of the sample to be analysed (for instance, dedicated spark stands may be available to the system for different materials to be analysed). The overall benefits include a faster, more reliable and more stable analysis, with fewer resources to operate and maintain the spectrometer.

In a sixth aspect, there is described an atomic emission spectrometer comprising the spark stand and atomic emission spectrometer stage described above. The atomic emission spectrometer may further comprise one or more typical components of a spectrometer, such as a spectrograph for analysing light emitted from the spark chamber during analysis of a sample.

BRIEF DESCRIPTION OF THE DRAWINGS

The present invention will now be described, by way of example only, with reference to the accompanying drawings, in which.

In the drawings, like parts are denoted by like reference numerals. The drawings are not drawn to scale.

DETAILED DESCRIPTION OF THE DRAWINGS

Figure 1:
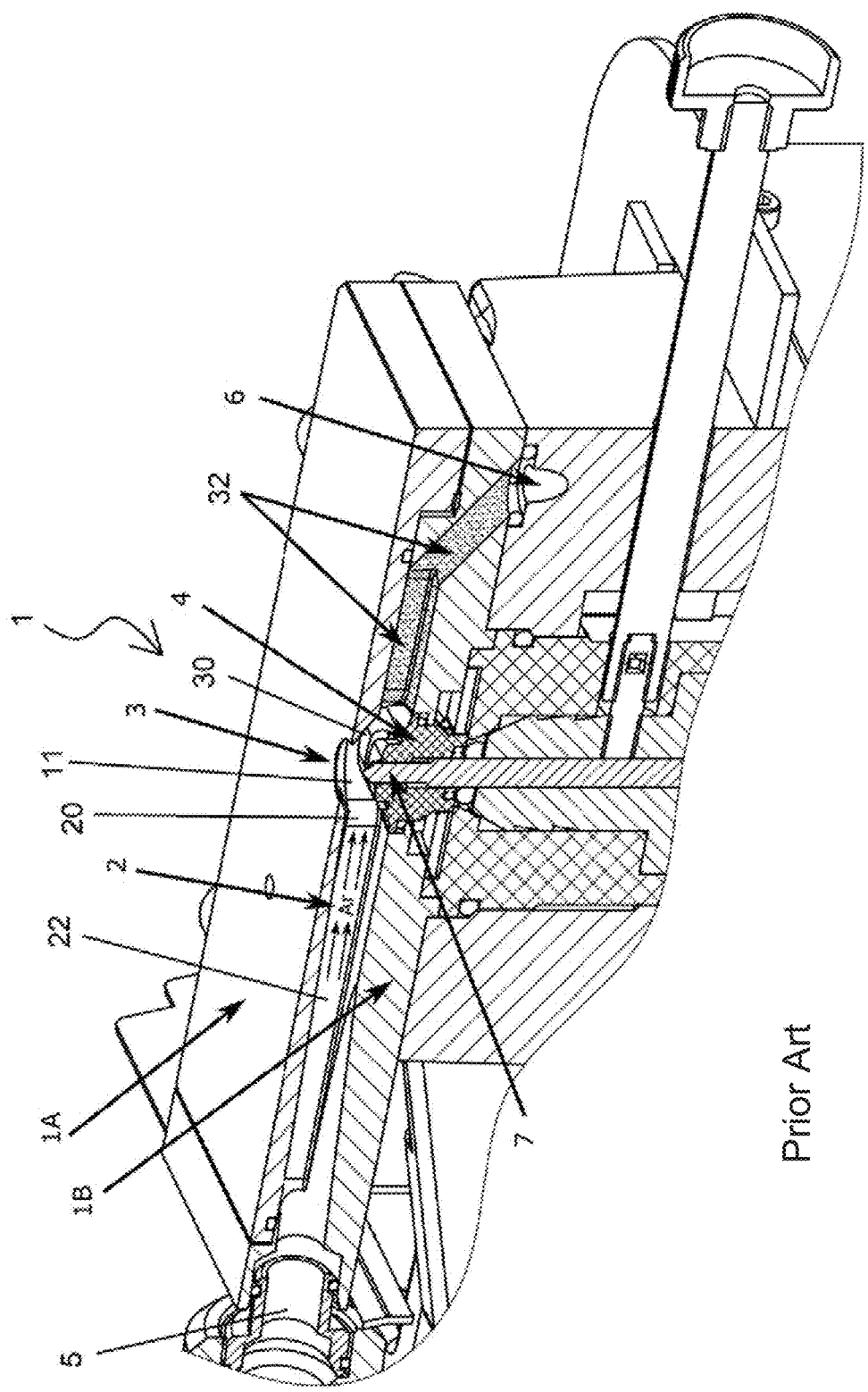
FIG. 1 is a cross-sectional perspective view of a typical, prior art spark stand of an atomic emission spectrometer (AES)

To aid understanding of the invention, an example of a typical prior art spark stand connected to atomic emission spectrometer is shown in FIG. 1 in cross-section. In particular, this shows an atomic emission spectrometer 1 having a spark stand comprising a lower table 1B and an upper table 1A. The lower table 1B is fixed to or comprises part of the overall spectrometer, and the upper table 1A is disconnectable from the lower table only by removal of semi-permanent fixing means (such as screws).

A gas inlet 22, spark chamber 11 and gas outlet 32 are defined between the upper and lower table. The spark chamber 11 is of generally cylindrical geometry (i.e. having a cylindrical chamber wall), and has an aperture or opening 3 through the upper table 1A to the atmosphere. In use, a sample is positioned over the opening 3, which thus defines a sample mounting position on the upper table. A generally cylindrical electrode 7 protrudes into the spark chamber 11 through the lower table 1B. The electrode 7 has a pyramidal or pin-shaped head, which is arranged below the opening 3 to the spark chamber. As such, the point of the electrode 7 is closely proximate, but not touching, a sample positioned over the opening at the sample position. An insulator 4 is arranged rotationally symmetrically around the electrode 7, between the electrode 7 and the lower table 1B, in order to prevent discharges to the spark chamber wall.

In use, a sample is placed in the sample position to close the aperture 3 to the spark chamber 11. The sample is secured so as to make a leak-proof seal with the upper table 1A. A spark is then ignited between the electrode 7 and the closest surface of the sample by application of a voltage to the electrode (and more specifically, a large potential difference between the electrode and the sample). This generates a plasma which ablates and vaporises matter from the surface of the sample, the light emission from which is analysed at a spectrograph (not shown) via an optical conduit 5.

The spark ignition takes place under an inert atmosphere (such as argon), which is provided by flow of an inert gas through the gas inlet conduit 22 at the spark table. The gas inlet conduit 22 is fed with an inert gas from a source upstream (not shown). The gas flows in the direction indicated by arrows 2 at FIG. 1 through a gas inlet orifice 20 into the spark chamber 11. Ablated material is carried from the spark chamber 11 through a gas outlet orifice 30 and via a gas outlet conduit 32 to an exhaust pipe 6. The gas inlet orifice 20 and gas outlet orifice 30 are arranged at opposite walls of the spark chamber 11. The gas inlet 22 and gas outlet 32 conduits are provided by channels formed or defined between the upper 1A and lower 1B tables.

Figure 2:
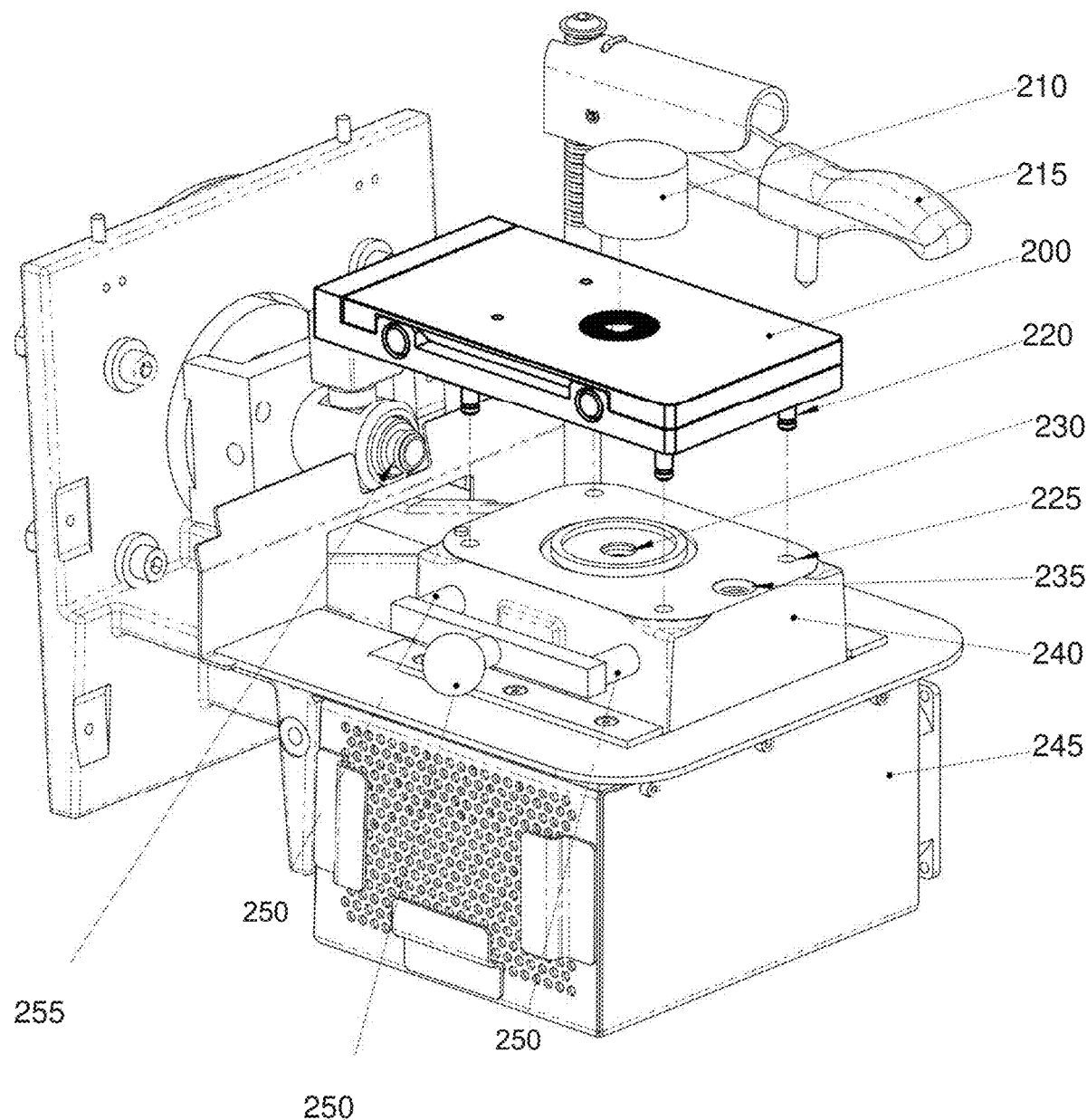
FIG. 2 is a perspective, partially exploded view of a spark stand and an atomic emission spectrometer stage according to the present invention.

FIG. 2 shows a perspective view of a spark stand 200 according to the claimed invention, and an atomic emission spectrometer stage 240 for receiving the spark stand. The view in FIG. 2 is partially exploded.

As shown in FIG. 2, the spark stand 200 of the present invention comprises a separate unit or cartridge which can be removed or separated from the atomic emission spectrometer stage 240 (and thus the atomic emission spectrometer overall).

Various connectors and fixing mechanisms are provided for proper connection, fixture and alignment of the spark stand. These are described in more detail below, in particular with reference to FIG. 3. For reference, the following features are illustrated as being part of the apparatus of FIG. 2: a sample 210, to be arranged over an aperture to a spark chamber defined within the spark stand 200 when the spectrometer is in use; a sample holder or clamp 215, for maintaining the sample in the sample position, and ensuring good contact with the sample table to close the aperture to the spark chamber; spark stand fixture pins 220, for coupling and alignment of the spark stand 200 to the atomic emission spectrometer stage 240; an aperture 230 for receiving a portion of an electrode protruding from and fixed within the spark stand 200, when the spark stand is coupled to the spectrometer; cavities 225 for receiving the spark stand fixture pins 220 at the spectrometer stage 240 when the spark stand 200 is coupled to the spectrometer; a gas inlet 235, for receiving gas passed through the spark stand; a gas outlet 255, for flowing gas into the spark stand; a power source 245, for contacting to and providing a voltage at an electrode in the spark stand 200; and a lever or handle 250 for actuation of a locking system used for coupling the spark stand 200 and the atomic emission spectrometer stage 240.

Figure 3:
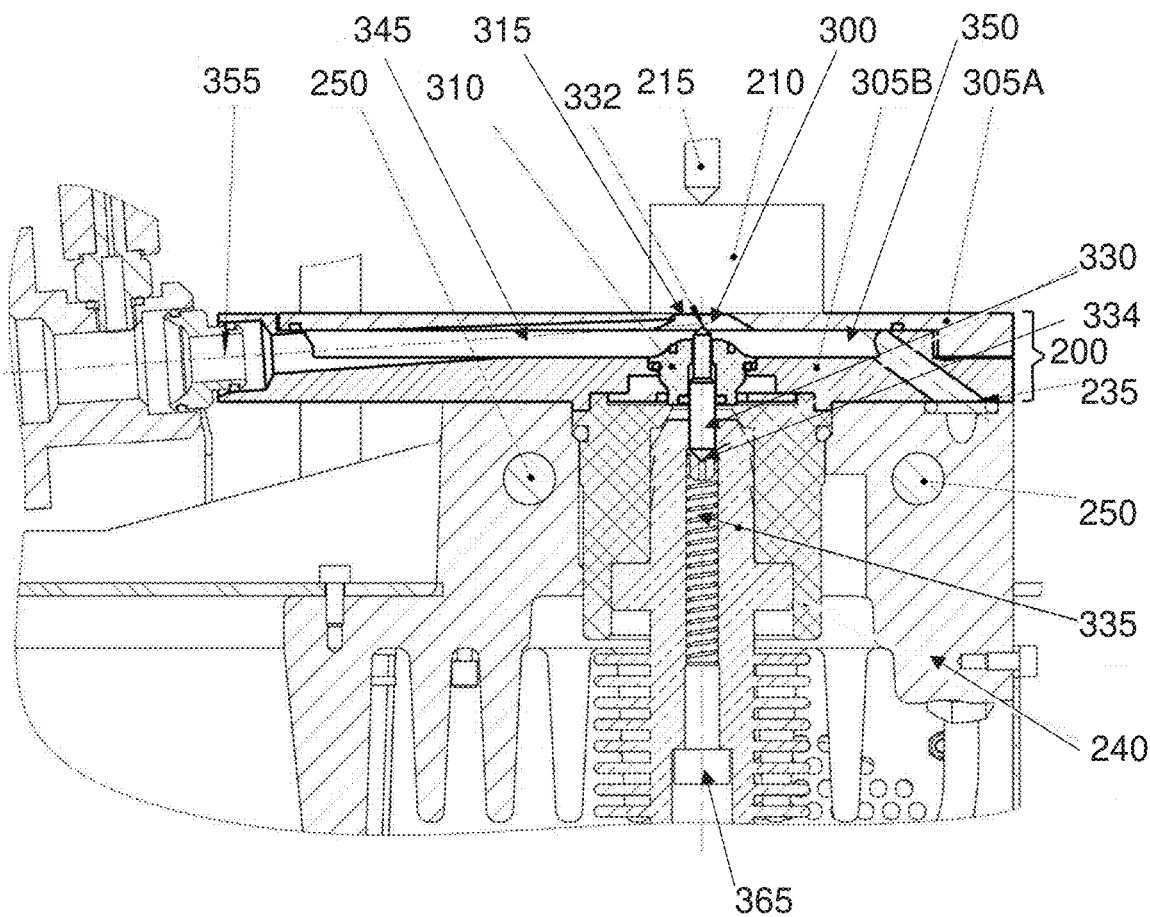
FIG. 3 is a cross-sectional view of the spark stand coupled to a stage of the atomic emission spectrometer of FIG. 2.

The configuration of the spark stand 200 is described in more detail with reference to FIG. 3. FIG. 3 shows a cross-sectional view of the spark stand 200 coupled to the atomic emission spectrometer stage 240. Within the figure, lines delineating portions of the spark stand or cartridge are shown in bold.

The spark stand comprises an upper table 305A and a lower table 305B. A spark chamber 300 is defined between the upper and lower table, with an aperture or opening 315 in the upper table to the spark chamber. A gas inlet passageway or conduit 345 is also defined between the upper and lower table, to direct gas to flow into the spark chamber 300. A gas outlet passageway or conduit 350 is defined between the upper and lower table, to allow gas to flow out of and away from the spark chamber 300, through a gas inlet 235 at the atomic emission spectrometer stage 240, and subsequently out of the instrument via an exhaust.

An electrode 330 is arranged protruding into the spark chamber 300, directly below the spark chamber aperture 315. An insulator 310 is arranged in the lower table around the circumference of the electrode, in order to isolate the electrode 300 from the lower table 305B and walls of the spark chamber. The electrode 330 is elongate (in particular, substantially cylindrical). A first end 332, which protrudes into the spark chamber 300, is pyramidal (i.e. terminates at a point). The pointed first end 332 of the electrode ensures a small area from which an arc or spark will be generated during use of the atomic emission spectrometer. At a second end 334 of the electrode (distal from or opposite the first end), the electrode protrudes from the underside of the lower table of the spark stand. The second end 334 of the electrode is configured to make electrical contact with a connector or contact 335 at the spectrometer stage (as described below). It will be understood that the second end 334 of the electrode could have any shape or arrangement suitable for making good electrical contact with a power source of the spectrometer.

The spark stand 200 is coupled to the spectrometer stage 240 as shown in FIG. 3. The spectrometer stage includes a resilient connector 335, which connects the electrode 330 at the spark stand to a power source (not shown in FIG. 3). The resilient connector 335 in FIG. 3 comprises a metallic spring, which, when the spark stand 200 is coupled to the spectrometer stage 240 as shown in FIG. 3, is at least partially under compression between the electrode 330 fixed in the lower table 305B of the spark stand and a coupling 365. to the power source As such, the spring makes good electrical contact between the electrode and the power source.

The spectrometer stage 240 comprises a gas outlet, for connection to the gas inlet 345 at the spark stand. The spectrometer stage further comprises a gas inlet 235, which connects to the gas outlet 350 at the spark stand. A retractable connector 355 is shown at the gas inlet at the spectrometer stage. The retractable connector may be moveable or be resilient, in order to provide a sealable, leak-proof connection between the spectrometer stage and the spark stand. Examples of suitable connectors include sprung, push-fit connectors, or screw connectors. A resilient O-ring may be used between the gas outlet 255 at the spectrometer stage and the gas inlet 345 of the spark stand (for example, as part of retractable connector 355), and between the gas outlet 350 at the spark stand and the gas inlet 235 at the spectrometer, in order to reduce gas leaks from the connector.

The spectrometer of FIG. 3 further shows a mechanical locking mechanism 250, which cooperates with fixture pins 220 at the spark stand (shown only in FIG. 2). The spark stand 200 is coupled with the spectrometer stage 240 via the locking mechanism 250. In particular, actuation of a lever (250 in FIG. 2) by a user of the apparatus moves the locking mechanism from a first position, in which the locking mechanism is not interlocking with the fixture pins 220 at the spark stand, to a second position, in which the locking mechanism is interlocking with the fixture pins 220 at the spark stand. When the locking mechanism 250 is interlocking with the fixture pins 220, the spark stand 200 is securely fastened to the spectrometer stage 240, such that the respective gas inlets and gas outlets mate, and the electrode at the spark chamber is in contact with the resilient connector. When the locking mechanism 250 is not interlocking with the fixture pins 220, the user can easily remove the spark stand 200, by simply lifting the spark stand away from the spectrometer stage 240. The locking mechanism 250 is operated without any tools or additional means, and can be hand operated by the user. Alternatively, the lever of the locking means 250 can be operated by a robotic arm under control of a controller (for example, via a computer program). In this way, the decoupling of the spark stand 200 from the spectrometer stage 240 may be automated or semi-automated.

To undertake analysis of a sample, a conductive sample 210 can be mounted at the sample position on the upper table 305A, over the aperture 315 to the spark chamber 300. The sample clamp 215 can be applied to apply downward force to hold the sample 210 in place on the spark stand. The power source 245 provides a large voltage between the electrode 330 and the sample 210. Consequently a spark or arc forms between the pointed end 332 of the electrode 330 and the closest sample surface. This generates a plasma, the light emission from the plasma being received at an optical conduit (positioned aligned with the gas inlet passageway 345). The light emission is subsequently analysed to provide characterisation of the sample.

As discussed above, the process of vaporisation and ablation of a sample can result in debris and residue from the sample accumulating at the surfaces of the gas inlet and outlet passageways 345, 350 and the spark chamber 300 in the spark stand. If such debris and residue is not removed before analysis of another sample, contamination of the plasma can occur (thereby reducing the accuracy of the analysis). Accordingly it is necessary to carefully remove any debris or residue before measuring different samples.

As discussed above, the present invention allows for straightforward and fast decoupling and removal of the spark stand 200 from the spectrometer stage 240. Such removal simply requires operation of the described locking means 250, and does not require any separate tools or specific knowledge of the instrument. Beneficially, not only does this allow the spark stand 200 to be removed for easier cleaning of the internal spark chamber 300 and gas passageways 345, 350, it also allows for interchange of one or more identical spark stands. As such, excessive downtime of the spectrometer is avoided. Moreover, specific spark stands can be reserved for measurement of specific types of sample material, further reducing the possibility of contamination and erroneous analysis results.

As will be understood with reference to FIG. 2, in use, a spark stand 200 which requires cleaning is decoupled from the spectrometer stage 240 by actuation of the locking means 250 (for instance via the lever or handle at the spectrometer stage). The spark stand 200 can then be lifted away from the spectrometer stage 240 and taken for cleaning or maintenance (for instance, according to the method described below). Another, cleaned spark stand can be coupled to the spectrometer stage 240 in its place. To do this, the new spark stand is placed on the spectrometer such that the fixture pins 220 are aligned with the respective cavities 225 at the spectrometer stage 240. This alignment further ensures correct mating between connectors at the gas outlet 255 and gas inlet 235 of the spectrometer stage 240 with the respective gas inlet 345 and gas outlet 350 at the spark stand. In addition, when correctly aligned the electrode 330 at the spark stand is received through an aperture 230 in the spectrometer stage 240, for contact to the resilient contact 335 and electrical connection to the power source. The locking mechanism 250 can then be actuated to secure or lock the spark stand in place, for instance by interlocking of a portion of the locking mechanism 250 at the spectrometer stage with the fixture pins 220 at the spark stand.

Figure 4:
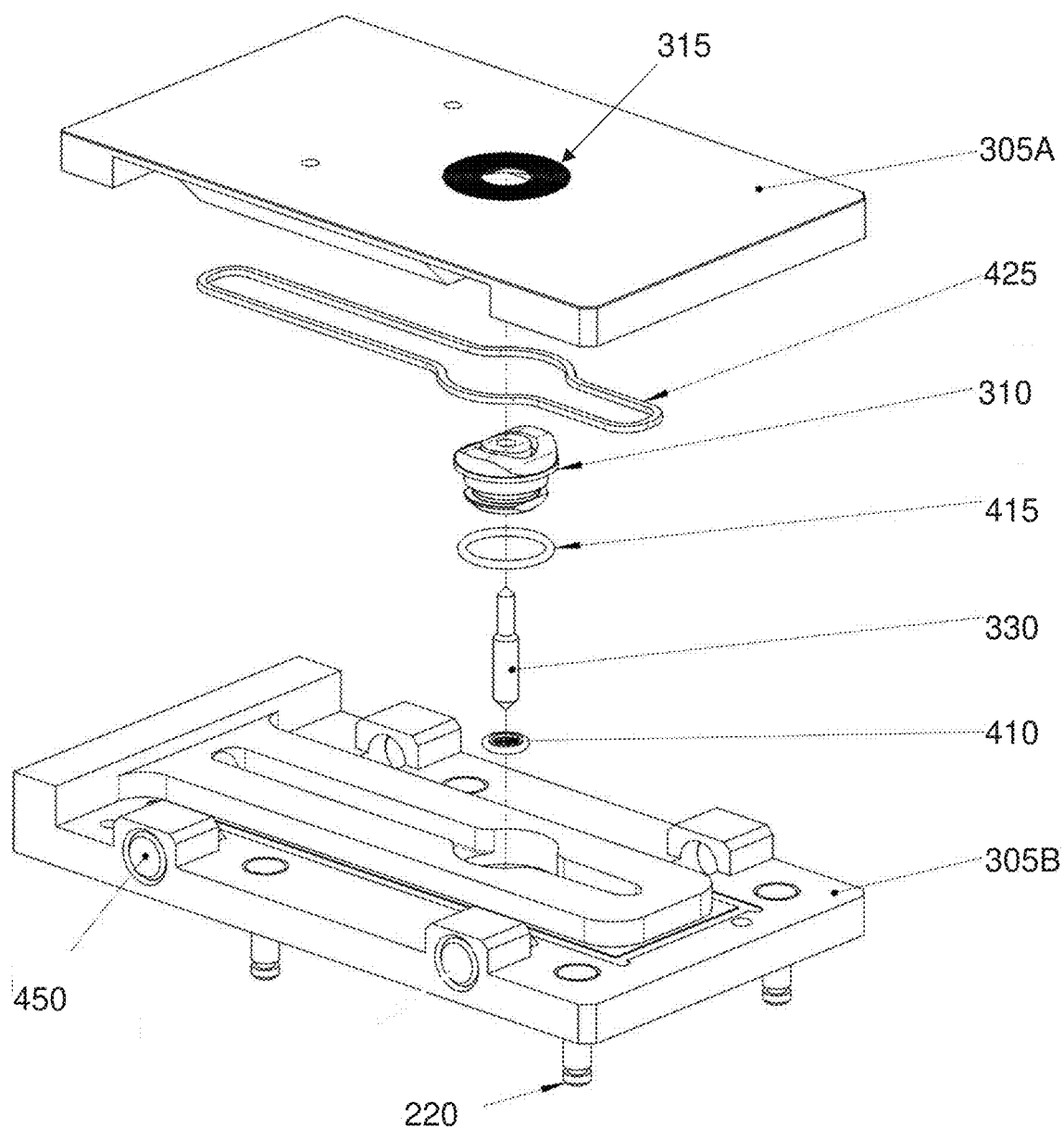
FIG. 4 is an exploded view of the spark stand of FIGS. 2 and 3.

As discussed above the described spark stand 200 is a unit or cartridge separable from the spectrometer. FIG. 4 shows an exploded view of the spark stand 200 (or spark stand cartridge). The upper table 305A can be connected to the lower table 305B to define the spark chamber 300 and gas passageways 345, 350 between. The upper table 305A has an aperture 315 arranged to provide an opening to the spark chamber defined below. A resilient seal 425 (or O-ring) is arranged between the upper 305A and lower 305B table, in order to seal the spark chamber and gas passageways. An insulator 310 is fixed in the lower table 305B (having a resilient seal or O-ring 415 therebetween), and the electrode 330 is arranged to extend through the insulator 310, to protrude from the upper side of the lower table 305B (into the spark chamber) and from the underside of the lower table 305B (for connection to a power source at the spectrometer). A resilient seal 410 (or O-ring) is arranged between the electrode 330 and the isolator 310 to reduce gas leakage form the spark chamber when the spark stand is in use.

FIG. 4 further shows fixture pins 220 protruding from the underside of the lower table 305B, for cooperation with the locking mechanism 250 at the spectrometer stage. Further mating portions 450 for connection with the locking mechanism at the spectrometer stage are shown at the lower table.

Figure 5:
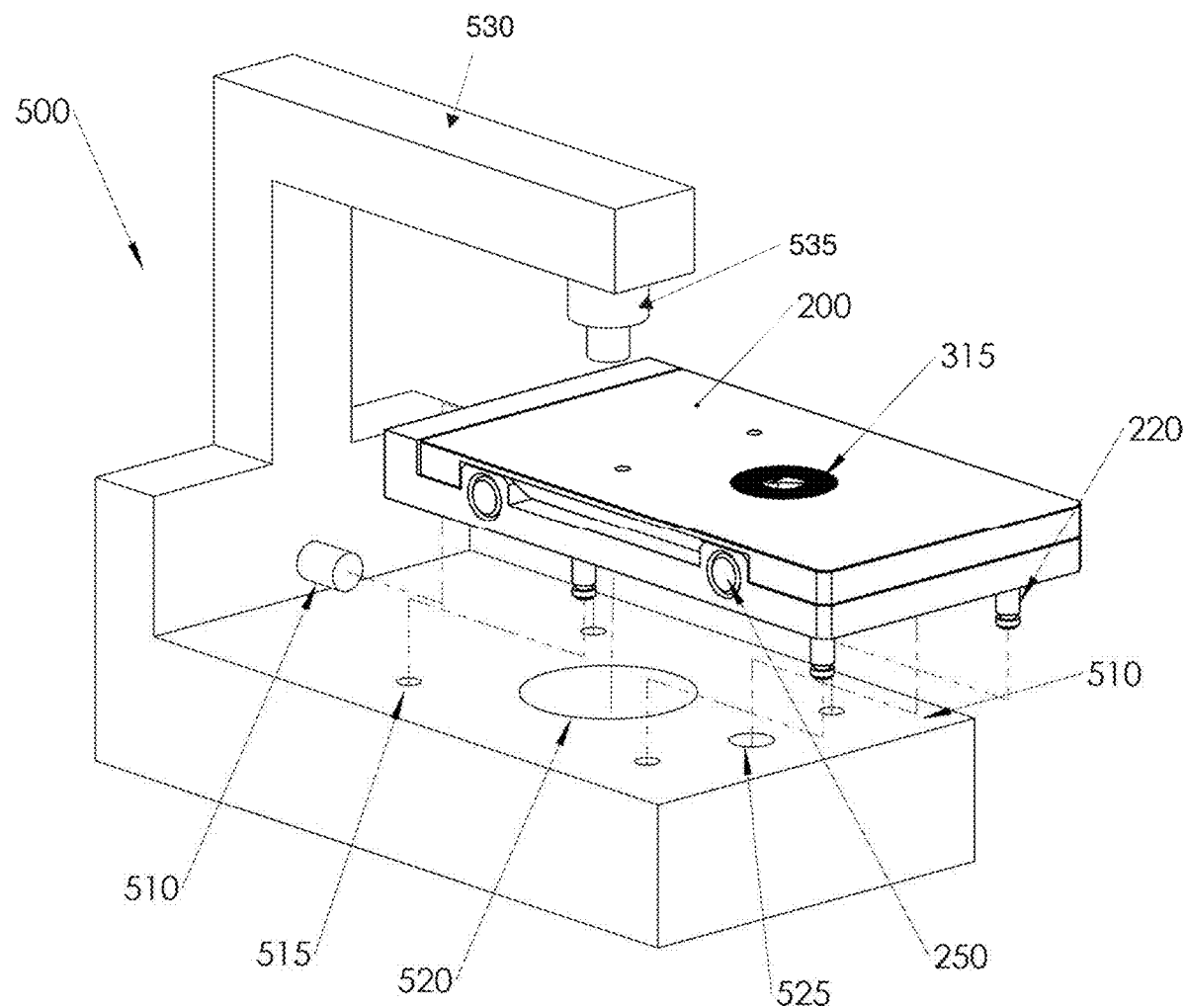
FIG. 5 is a schematic view of the spark stand and associated maintenance appliance.

A particular benefit of the present invention is that, as a result of the complete decoupling of the spark stand from the spectrometer, the spark stand can be more easily cleaned. Not only can the spark stand be more easily cleaned at a location away from the spectrometer itself, the inventors have recognised that the movability of the spark stand allows for use of a specially designed maintenance tool or appliance. The maintenance appliance 500, together with a spark stand 200 to be cleaned, is shown in FIG. 5 in a partially exploded view.

The maintenance appliance 500 comprises a platform 510 or stand upon which the spark stand 200 can be mounted during cleaning and maintenance. The platform 510 includes a cavity 520, for receiving the electrode 330 protruding from the base of the spark stand 200 when the spark stand is coupled to the platform. The platform 510 further comprises cavities 525 for receiving fixture pins 220 protruding from the underside of the spark stand. In addition, the maintenance appliance comprises a first orifice 510, for connection to the gas inlet 345 at the spark stand, and a second orifice 525, for connection with the gas outlet 350 at the spark stand.

For cleaning of the gas inlet and outlet passageways 345, 350 and spark chamber 300 of the spark stand, gas or liquid (fluid) can be passed between the first orifice 510 of the maintenance appliance to the second orifice 525 of the maintenance appliance, flowing through the gas passageways 345, 350 and spark chamber 300 of the coupled spark stand. The liquid and gas can be pressurised, or passed with a high-flow rate, so as to apply frictional forces to clean and remove debris from the inner walls of the passageways and chambers. The liquid or gas can be passed with a continuous or pulsed flow, in order to achieve the best cleaning results. The fluid could be passed in either direction through the spark stand.

More specifically, to clean a spark stand, the spark stand 200 can be coupled to the maintenance appliance 500, ensuring connection of the first 510 and second 525 orifice at the maintenance appliance to the respective gas inlet 345 and gas outlet 350 at the spark stand. A seal can be arranged over the aperture 315 to the spark chamber in the upper table of the spark stand. This closes or seals the spark chamber 300, except for access via the gas inlet and outlet passageways 345, 350. Any suitable sealing means could be used.

An adequate seal is required to maintain a pressurised, high-flow rate through the spark chamber 300 and gas inlet and outlet passageways 345, 350 at the spark stand. Therefore the seal can be tested for leaks at the connections or at the sealed aperture. For instance, the region between the first orifice 510 and second orifice 525 of the maintenance appliance (and so the gas passageways 345, 350 and spark chamber 300) can be sealed and pressurised. After a given time interval, the pressure within the sealed portion can be tested and, if the pressure in the sealed portion has not changed by a significant amount, then an adequate seal at the aperture to the spark chamber (and between the gas inlet and outlet connectors) can be assumed. If the pressure change is significant however, the seal at the spark chamber aperture and connectors or other seals should be checked and resealed.

Providing the system is adequately sealed, a fluid (liquid or gas) can then be flowed between the first 510 and the second 525 orifice of the maintenance appliance 500 (via the gas inlet 345, spark chamber 300 and gas outlet 350 of the coupled spark stand) with a high flow rate. Any suitable liquid or gas could be used. For instance, high pressure air could be used to remove debris in the passageways or cavities through which the fluid passes. It will also be understood that a reagent could be flowed through the maintenance appliance and spark stand, wherein the reagent is chosen to chemically react with a material residue known to be accumulated at the inner surfaces of the gas passageways and spark chamber (thereby removing the residue).

After flow of the liquid or gas through the system, to verify that cleaning has been properly performed, a metallisation test can be conducted. This consists of passing an electrical current between an electrical contact to the gas inlet passageway 345 of the spark stand, and an electrical contact at the gas outlet passageway 350 of the spark stand. The resistivity (or impedance) between these contacts can be measured, and then compared to a predefined resistivity (or impedance). The resistivity (or impedance) between the contacts is inversely proportional to the amount of dust accumulated through the spark stand. Therefore, a lower measured resistivity indicates a reduction in residue at the gas passageways 345, 350 and spark chamber 330 in the spark stand.

After cleaning the internal passageways and chambers of the spark stand 200 the configuration of components of the spark stand can be recalibrated. In particular, the position of the electrode 330 (and the extent to which it protrudes into the spark chamber 300) can be adjusted. This is necessary to achieve the optimum separation between the uppermost tip 332 of the electrode 330 and the closest surface of a sample arranged at the spark stand (over the aperture 315 to the spark chamber). As will be understood, the electrode 300 may be moved slightly during the maintenance and cleaning procedure described above, and so measurement and readjustment of the electrode position after the cleaning process is desired. Advantageously, repeatability of analyses is improved if the sample-electrode gap is maintained at a predetermined distance between different measurements.

The maintenance appliance 500 illustrated in FIG. 5 includes an adjustor mechanism, comprising an adjustor arm 530, and a coupler portion 535 that is moveable in the axis of movement of the electrode. In particular, the moveable, coupler portion 535 may move in the longitudinal direction of the electrode 330 (shown in the spark stand 200 of FIG. 3, in other words, in the vertical direction). The coupler portion 535 can couple with the electrode 330, for instance by coupling with the first end 332 of the electrode 330, by insertion of the coupler portion 535 through spark chamber aperture 315 (when the spark stand 200 is coupled to the maintenance appliance 500). Once coupled, the coupler portion 535 can be moved linearly (up or down) to slide the electrode 330 with respect to insulator 310, and thereby adjust the height by which the electrode 330 protrudes into the spark chamber 300. In a preferred example, the electrode 330 is moved to provide a gap of 3 mm between the electrode tip 332 and a sample placed at the sample position of the spark table (over aperture 315). Advantageously, the maintenance appliance 500 and adjustor mechanism 530, 535 allows for finer, more precise control of the adjustment of the electrode 330, as well as more accurate measurement of it position. As such the error on the arrangement of the gap is decreased from around +/−0.03 mm in prior art systems to around +/−0.01 mm in the present invention.

After the method of maintenance (including cleaning and recalibration) of the spark stand has been completed, the spark stand 200 can be decoupled from the maintenance appliance 500, and then moved and recoupled to at the stage 240 of an atomic emission spectrometer, as described above.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

Although the locking mechanism 250 shown in FIGS. 2 and 3 show a mechanical means, comprising a lever and a handle, any suitable (tool-less) locking mechanism for securing or coupling the spark stand to the spectrometer can be used. For example, any configuration of mechanical means to secure or connect the spark stand 200 and spectrometer stage 240 could be used. Alternatively, a magnetic coupling between the two apparatus components could be used. The locking mechanism 250 can be controlled or operated via a robotic means and/or a controller executing a computer program.

Although in the specific embodiments described, the moveable portions of the locking mechanism 250 are shown at the spectrometer stage 240, it will be understood that the moveable portion of the mechanical locking mechanism 250 could be arranged at the spark stand 200. However, this may increase the weight and complexity of the spark stand.

Furthermore, although the electrode 330 is shown to be fixed in the lower table 305B of the spark stand, in some circumstances the electrode 330 could be fixed within the spectrometer stage and received through an aperture in the spark stand. However, this may be a less preferred configuration, in view of the increased risk of contamination due to residue at the electrode itself. Furthermore, this may increase the risk of a poor seal at the spark chamber.

In some cases, a controller can be used to control the locking mechanism, to control the gas flow at the maintenance appliance during the maintenance and cleaning of the spark stand, and also to perform the seal testing and the resistivity test described above. The controller may arranged at a computer, and arranged to perform the control operations upon execution of a computer code.

Although the adjustor mechanism is shown having a specific configuration of adjustor arm and coupler portion in FIG. 5, it will be understood that various configurations for the adjustor mechanism can be envisaged. In each configuration, the adjustor mechanism is arranged to perform the function of movement of the electrode to change the height by which the electrode protrudes into the spark chamber. For instance, in an alternative example to FIG. 5, the adjustor mechanism may be configured within the platform 510 of the maintenance appliance, and a moveable coupler portion may couple with a portion of the electrode protruding from the bottom surface of the lower table of the spark stand (for example, end 334 of the electrode of the spark stand in FIG. 3, which would be received into the cavity 520 of the maintenance appliance in FIG. 5, and which could couple with an adjustor mechanism arranged therein). In either described example, the coupling mechanism could be mechanical or magnetic.

The invention claimed is:

1. A spark stand for an atomic emission spectrometer, comprising:
   a spark chamber;
   a gas inlet for flowing gas into the spark chamber; and
   a gas outlet for carrying gas from the spark chamber;
   wherein the spark stand is adapted to be decouplable from a stage at the atomic emission spectrometer, to permit removal and exchange with another spark stand;
   wherein the gas inlet at the spark stand is connectable to a gas outlet on the stage at the atomic emission spectrometer and the gas outlet at the spark stand is connectable to a gas inlet on the stage at the atomic emission spectrometer;
   wherein the spark stand is configured for tool-less coupling and decoupling from the atomic emission spectrometer stage.

2. The spark stand of claim 1, comprising a releasable locking mechanism, configured for releasably coupling the spark stand to the atomic emission spectrometer stage.

3. The spark stand of claim 1, further comprising an electrode arranged to protrude into the spark chamber, the electrode further configured to make electrical contact with a power source at the atomic emission spectrometer when the spark stand is coupled to the atomic emission spectrometer stage.

4. The spark stand of claim 3, further comprising a resilient contact to provide electrical contact between the electrode and the power source at the atomic emission spectrometer, the resilient contact configured to be under compression when the spark stand is coupled to the atomic emission spectrometer stage.

5. The spark stand of claim 1, further comprising one or more projections or cavities, for cooperation with a respective one or more cavities or projections at the atomic emission spectrometer stage.

6. The spark stand of claim 5, wherein at least one of the one or more projections are arranged at the spark stand, and the at least one of the one or more projections are adapted for cooperation with the releasable locking mechanism at the atomic emission spectrometer stage.

7. An atomic emission spectrometer stage adapted to be releasably couplable to the spark stand of claim 1, the atomic emission spectrometer stage comprising:
a gas outlet for connection to the gas inlet at the spark stand, and a gas inlet for connection to the gas outlet at the spark stand; and
wherein the atomic emission spectrometer stage is configured for tool-less coupling to and decoupling from the spark stand.

8. The atomic emission spectrometer stage of claim 7, comprising a releasable locking mechanism, configured to releasably couple the spectrometer stage to the spark stand.

9. The atomic emission spectrometer stage of claim 8, wherein the releasable locking mechanism is configured to cooperate with at least one projection at the spark stand.

10. The atomic emission spectrometer stage of claim 7, further comprising a connecting contact, configured to make electrical contact between an electrode of the spark stand and a power source at the atomic emission spectrometer when the spark stand is coupled to the atomic emission spectrometer stage.

11. The atomic emission spectrometer stage of claim 10, wherein the connecting contact is a resilient contact, configured such that the resilient contact is under compression when the electrode of the spark stand cartridge is coupled to the atomic emission spectrometer stage.

12. The atomic emission spectrometer stage of claim 7, further comprising a retractable connector at the gas outlet of the atomic emission spectrometer stage, and/or a retractable connector at the gas inlet of the atomic emission spectrometer stage, configured to mate with a corresponding connector at the respective gas inlet and/or gas outlet at the spark stand when the spark stand is coupled to the atomic emission spectrometer stage.

13. An atomic emission spectrometer, comprising the atomic emission spectrometer stage of claim 7.

* * * * *